United States Patent [19]
Ruf et al.

[11] Patent Number: 4,838,217
[45] Date of Patent: Jun. 13, 1989

[54] CAST IRON CAMSHAFT FOR INTERNAL COMBUSTION ENGINES

[75] Inventors: Max Ruf, Obereisesheim; Erwin Korostenski, Oedheim, both of Fed. Rep. of Germany

[73] Assignee: Audi AG, Fed. Rep. of Germany

[21] Appl. No.: 154,187

[22] Filed: Feb. 10, 1988

[30] Foreign Application Priority Data

Feb. 18, 1987 [DE] Fed. Rep. of Germany ....... 3705114

[51] Int. Cl.$^4$ ............................................... F01L 1/04
[52] U.S. Cl. ...................................... 123/90.6; 74/567
[58] Field of Search .............................. 123/90.6, 90.27; 74/567, 568 R, 569; 29/156.4 R

[56] References Cited

U.S. PATENT DOCUMENTS

| | | | |
|---|---|---|---|
| 2,552,724 | 5/1951 | Lang | 74/567 |
| 4,652,724 | 3/1987 | Morita | 219/121.85 |
| 4,665,766 | 5/1987 | Umeha | 74/567 |

Primary Examiner—Charles J. Myhre
Assistant Examiner—Weilun Lo
Attorney, Agent, or Firm—Kane, Dalsimer, Sullivan, Kurucz, Levy, Eisele and Richard

[57] ABSTRACT

A cast iron camshaft (1) for an internal combustion engine, has at one end a toothed pulley (3) engaging a toothed belt, and an internal tensile member including a screw threaded bolt (5). The bolt engages part of the camshaft (1) adjacent the end where the toothed pulley (3) is fixed, and extends along a longitudinal bore (6), and has a screw threaded end (8) which engages an internal thread (9) positioned adjacent the point where the bending moment exerted on the camshaft by the toothed belt tension P becomes zero. As a result, the alternating bending loads which would otherwise occur in the vicinity of the cross-section X—X which is in danger, are converted into a continuous compressive load, which can be sustained by the cast iron material more effectively than an alternating bending load.

7 Claims, 3 Drawing Sheets

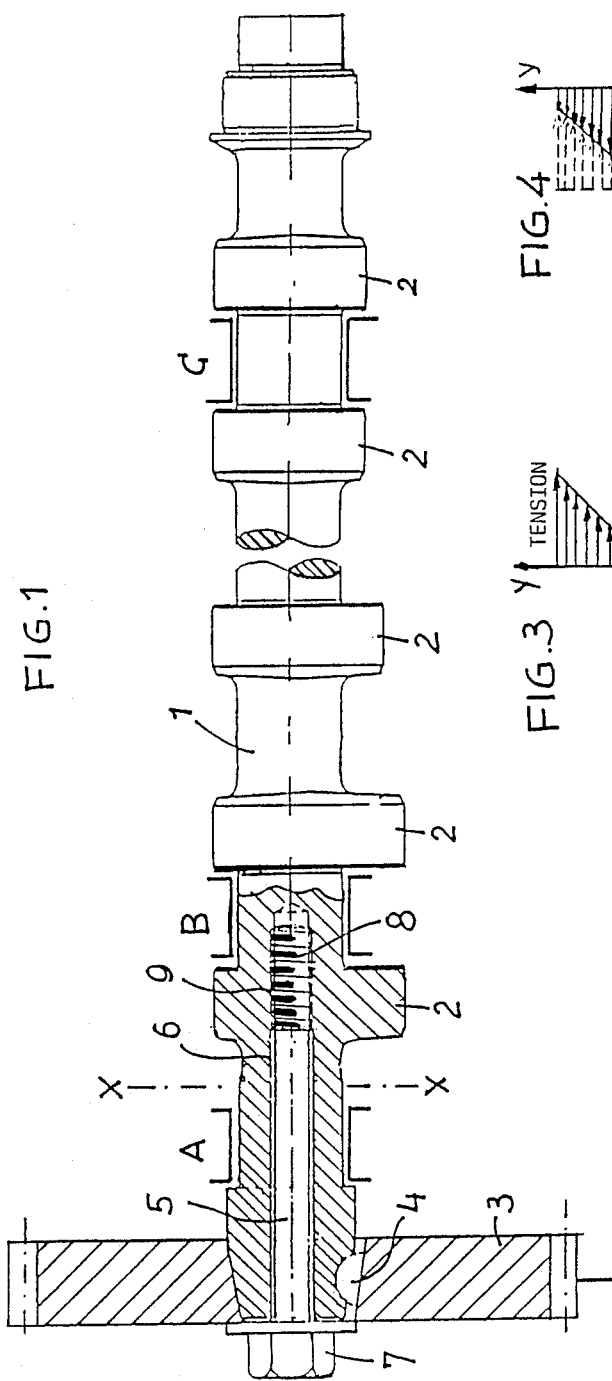
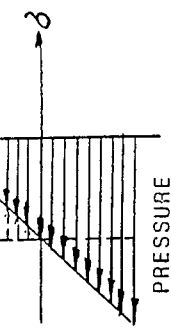
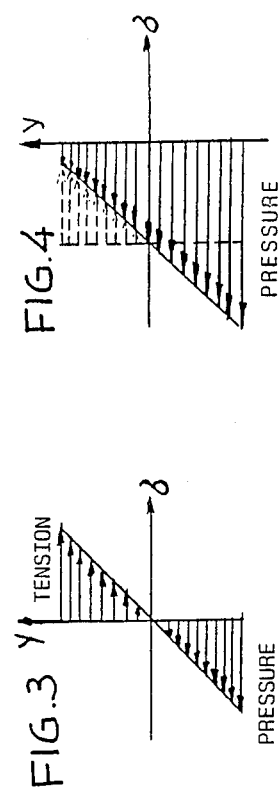
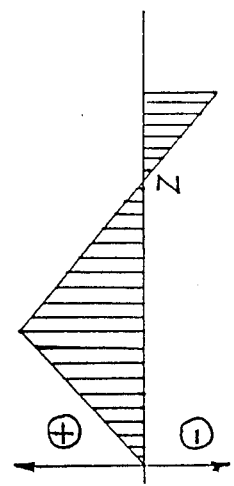

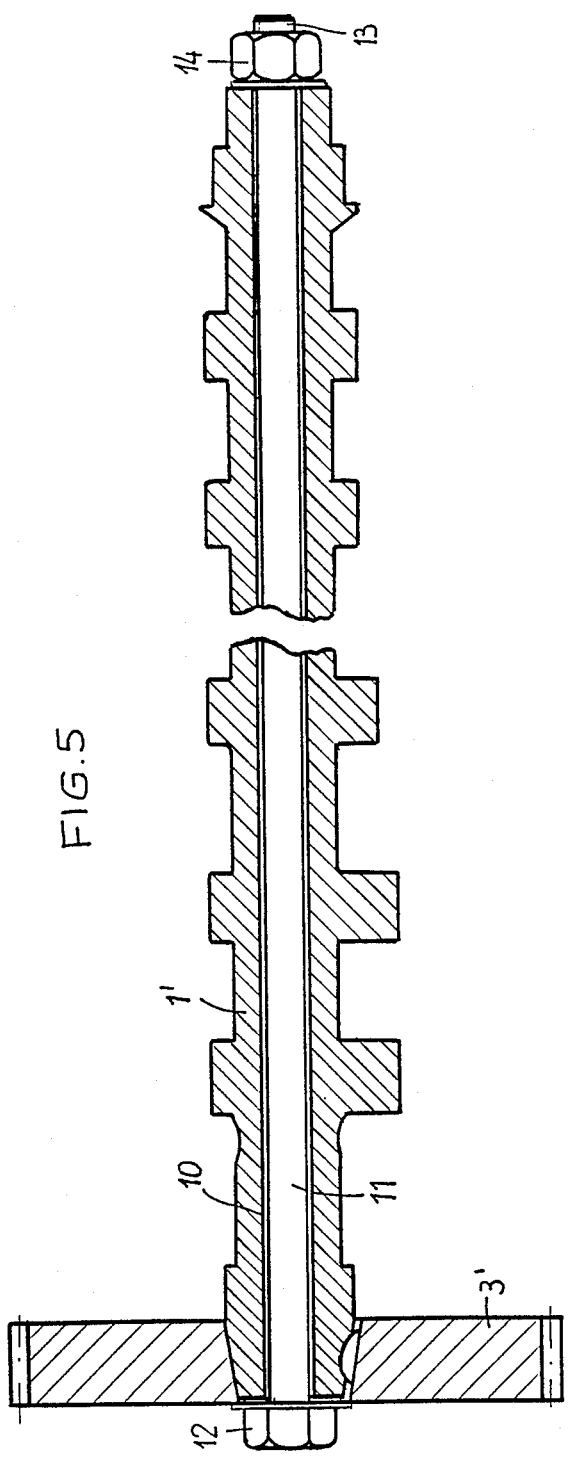

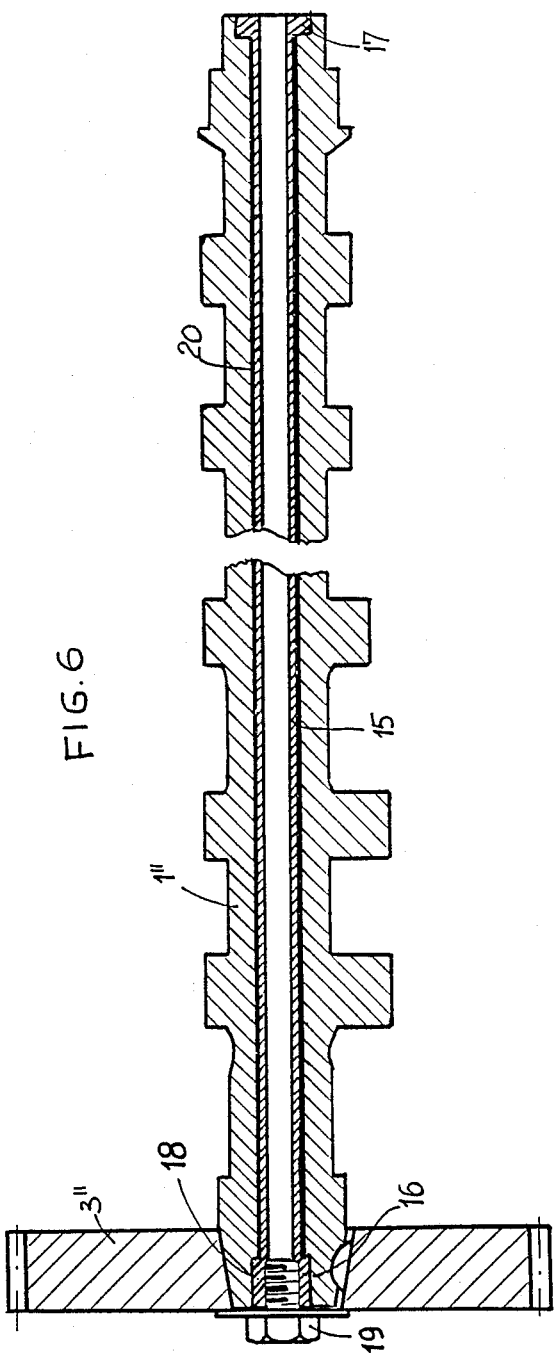

CAST IRON CAMSHAFT FOR INTERNAL COMBUSTION ENGINES

In modern internal combustion engines a very high specific surface pressure occurs between the cams of the camshaft and the tappets, rocker arms or rocker levers which co-operate therewith. On account of its good wear properties cast iron (grey cast iron, spheroidal-graphite cast iron or malleable cast iron) is particularly suitable as a material for camshafts, but a serious disadvantage of cast iron is its low alternating bending strength, which can cause fractures since the camshaft is subject to considerable fluctuations and reversal of bending moments during operation. Such camshaft failures mainly occur in the zone adjacent to or slightly beyond the point of support which is nearest to the end of the camshaft at which the drive pulley or sprocket is fixed, since a high bending moment is exerted on the camshaft by the driving chain or belt, which moment results in high alternating bending loads on account of the rotation of the camshaft.

Casting materials with a higher alternating bending strength are in fact known, but these generally have a lower permissible specific surface pressure, and therefore inferior wear properties.

The problem underlying the invention is t provide a cast iron camshaft, which not only permits high specific surface pressures and has favourable wear characteristics but with the danger of failures due to bending vibrations is reduced to a minimum.

Broadly stated the invention consists in a cast iron camshaft for an internal combustion engine, having at one end a drive pulley or pinion for an endless tension member and including means for creating in the camshaft a longitudinal compressive stress in at least part of the zone extending from the said end to a point at which the bending moment exerted by the tension member on the camshaft becomes zero.

The invention is based on the appreciation that cast materials in question can sustain a continuous compressive load which may be up to six times as great as the permitted alternating bending load. As a result of the invention compressive stresses are created in the cast iron which superimpose the alternating bending loads which are converted into continuous non-reversing -loading when the shaft rotates. As a result the camshaft can be more highly loaded continuously, so that failures are effectively avoided with a camshaft formed of a material with a relatively small alternating handing strength, but with good wear resistant properties.

The said compressive stress may be created for example by a screw threaded member which bears longitudinally on part of the camshaft adjacent the said end, and extends along an internal bore in the camshaft, and has a threaded part engaging an internal screw thread in the bore, positioned close to the point at which the bending moment becomes zero.

According to a preferred feature of the invention the screw threaded member also serves for axial location of the drive pulley or pinion.

Alternatively, the camshaft may have a longitudinal bore through which extends a tie member which is axially fixed at positions adjacent both ends of the camshaft.

Thus the compressive stress can be created in the cast material by tightening a screw or the like at one or both ends of the tie member.

In another form of the invention compressive stresses can be created in the cast material when the camshaft is cast, by providing a tie member which is actually included and cast into the casting material and which may consist of a tube or a bar formed of a material whose linear temperature coefficient of expansion is greater than that of the main camshaft casting material, means being provided for absorbing the longitudinal stresses between the tie rod and the cast material which occur when the cast material cools. When the cast assembly cools, tensile stresses are built up in the tie rod and compressive stresses in the cast material, on account of the different linear expansion coefficients. The shearing stresses which may occur in the boundary layer can be absorbed by suitable superficial roughness or by profiling of the surface of the tie rod or even by a collar at each of the two ends of the tie rod. To avoid any undesirable chilling effect en the cast material of the tie rod, the latter may be heated up beforehand, or during the casting operation may be held at a desired temperature by passing an electric current through it. Undesirable gas bubbles in the casting can also be avoided by this means. In the case of a grey cast iron material with a linear expansion coefficient $\alpha = 9-10$, one of the following materials may for example, be used for the tie rod:

| 10 NiCrAlTi | 32,20 | $-\alpha = 15$ |
|---|---|---|
| 2 CrNiSi | 18,25 | $-\alpha = 16.5$ |
| 15 CrNiSi | 20,12 | $-\alpha = 16.5$ |
| normal steel | | $-\alpha = 12.$ |

The invention may be performed in various ways and a number of specific embodiments will now be described by way of example with reference to the accompanying drawings in which:

FIG. 1 is a side elevation partly in section of a camshaft according to the invention, FIG. 2 is a diagram illustrating the variations in the bending moment in the critical zone of the camshaft, FIG. 3 is a diagram illustrating the stresses over the cross-section at the point X—X in FIG. 1 where there is a danger of failure, when no compressive prestress is provided, FIG. 4 is a diagram similar to FIG. 3 but showing the effect of compressive prestress of the part of the camshaft here there is a danger of failure, FIG. 5 is a sectional side elevation of a modified form of camshaft in accordance with the invention, and FIG. 6 is a sectional side elevation illustrating a third form of camshaft according to the invention.

The camshaft 1 illustrated in FIG. 1 is supported at the points A,B and C in an engine cylinder head (not illustrated) and provided with cams 2 for actuating inlet and/or exhaust valves (also not illustrated). At the left hand end of the camshaft 1 a driving wheel 3, (in this particular embodiment a toothed pulley), is fixed non-rotatably by means of a key 4.

The tension of the belt engaging the toothed pulley which is illustrated by the arrow P, exerts on the camshaft 1 a bending moment whose value varies as illustrated by the graph of FIG. 2. This bending moment, when the camshaft 1 rotates, creates alternating bending load which can lead to failure in the cross-section X—X if a cast iron with good wear properties but a low alternating bending strength is used for the camshaft. So as to make use of the good wear properties of this material and at the same time reduce the danger of failure to a reasonable dimension, a compressive stress is created and superimposed on the alternating bending stress in the endangered cross section X—X illustrated in FIG. 3, so as to convert it into a purely compressive stress as shown in FIG. 4: this is applied more particularly in the zone of the camshaft which extends from the point of application of the driving force P to the point Z at which the bending moment becomes zero (see FIG. 2). In the example illustrated in FIG. 1, this compressive stress is created by a bolt 5, which extends into a longitudinal bore 6 in the crankshaft and is located at its left hand end by the bolt head 7 engaging the toothed pulley 3, while at its right hand end a threaded section B engages in an internal thread 9 in the bore 6, this thread 9 being positioned at the zero point Z of the bending moment When the bolt 5 is tightened, the aforementioned compressive stress is therefore built up in the zone of the camshaft 1 which runs from the left hand end of the camshaft to the zero point Z of the bending moment, so that the stress pattern illustrated in FIG. 4 is provided in the endangered cross section X—X.

The example illustrated in FIG. 5 differs from that of FIG. 1 mainly in that the camshaft 1 is formed with a longitudinal bore 10 running its whole length through which extends a tie rod 11 having a bolt head 12 engaging the toothed pulley 3' at the left hand end of the camshaft 1', and a threaded section 13 at the other end, onto which is screwed a nut 14 which bears on the right hand end of the camshaft 1'. By tightening the nut 14, there is built up in the camshaft 1' a superimposed compressive stress by means of which the alternating bending load which would otherwise occur as shown in FIG. 3, is converted into a continuous compressive load at each cross-section of the camshaft. The tie rod 11 may be formed for example of a heavy bar or even a tube.

In the further example illustrated in FIG. 6, the required longitudinal compressive stress is created in the camshaft 1" when it is actually cast. To this end, there is cast in the camshaft 1" a tubular tie rod 15, which extends the entire length of the camshaft and is formed of a material having a linear thermal coefficient of expansion which is greater than that of the cast material. When the cast assembly cools, tensile stresses are built up in the tie rod 15 and compressive stresses in the cast material, on account of the different linear expansion coefficients. In order to absorb the shearing stresses which occur in the boundary layer between the tie rod 15 and the cast material when the cast material cools, the tie rod 15 is provided at each of its ends with a collar 16 or 17, against which the cast material is axially supported. The collar 16 has an internal thread 18 for accepting a bolt 19 by which the toothed pulley 3" is fastened in position. In addition to the collars 16 and 17, or instead of the latter, the surface of the tie rod 15 may be roughened or profiled to absorb the shearing stresses, as indicated diagrammatically by the thick lines 20. A heavy bar may also be cast into the camshaft instead of a tubular tie rod.

The function of the cast tie rod as shown in FIG. 6 is basically the same as that of the continuous tie rod shown in FIG. 5.

The advantages of the invention are naturally also evident if the camshaft drive is produced not by a toothed belt, but by a chain, as in both cases the alternating bending load on the camshaft is converted into a continuous compressive load.

We claim:

1. A cast iron camshaft for an internal combustion engine having at one end a drive pulley or pinion connected to an endless tension member and including means for creating in the camshaft a longitudinal compressive stress in at least zone extending from said end to a point at which the bending moment exerted by the tension member on the camshaft becomes zero, in which the means for creating the compressive stress includes a screw threaded member which bears longitudinally on part of the camshaft adjacent end and extends along an internal bore in the camshaft and has a threaded part engaging an internal screw thread in the bore positioned close to the point at which the bending moment becomes zero.

2. A cast iron camshaft according to claim 1 in which the screw threaded member also serves for axial location of the drive pulley or pinion.

3. A cast iron camshaft for an internal combustion engine having at one end a drive pulley or pinion connected to an endless tension member and including means for creating in the camshaft a longitudinal compressive stress in at least a zone extending from said end to a point at which the bending moment exerted by the tension member becomes zero, in which said means for creating a compressive stress includes an internal tie member which is cast into said cam shaft and extends substantially the entire length of the camshaft an is formed form a material whose linear coefficient of expansion is greater than that of the camshaft material, said tie member expanding during casting of the camshaft and contracting during cooling of the camshaft to a greater extent than the camshaft, and means for transmitting longitudinal stresses from the tie member to the cast iron material of the camshaft which occur when the casting cools.

4. A camshaft according to claim 3, having a longitudinal bore through which extends a tie member which is axially fixed at positions adjacent both ends of the camshaft.

5. A cast iron camshaft according to claim 3 in which the surface of the tie member is (roughened or profiled) formed to absorb the shearing stresses which occur in the boundary layer between the tie member and the camshaft casting when the casting cools.

6. A cast iron camshaft according to claim 3, in which the tie member has at each end an enlargement against which the camshaft casting bears axially.

7. A cast iron camshaft according to claim 3 in which the tie member is a tube or heavy bar.

* * * * *